United States Patent
Watanabe et al.

(10) Patent No.: US 6,631,388 B1
(45) Date of Patent: Oct. 7, 2003

(54) INFORMATION PROCESSING METHOD, APPARATUS, AND SYSTEM FOR A MULTIMEDIA PRESENTATION SYSTEM WITH A FILE UPDATE PROCESS

(75) Inventors: Ikuo Watanabe, Yokohama (JP); Yoshitsugu Iwabuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,974

(22) Filed: Nov. 12, 1999

(30) Foreign Application Priority Data

Nov. 16, 1998 (JP) .......................................... 10-341188

(51) Int. Cl.⁷ .............................................. G06F 17/30
(52) U.S. Cl. .................................... 707/206; 707/104.1
(58) Field of Search ......................... 707/1, 104.1, 206, 707/200; 369/124.08; 380/201

(56) References Cited

U.S. PATENT DOCUMENTS

| | | | | |
|---|---|---|---|---|
| 5,043,831 A | | 8/1991 | Muramoto et al. ............ 360/66 |
| 5,267,351 A | * | 11/1993 | Reber et al. .............. 707/104.1 |
| 5,553,281 A | * | 9/1996 | Brown et al. ............. 707/104.1 |
| 5,717,663 A | * | 2/1998 | Fujita .......................... 369/32 |
| 5,765,164 A | * | 6/1998 | Prasad et al. ............. 707/104.1 |
| 5,794,251 A | * | 8/1998 | Watanabe et al. ............ 707/200 |
| 5,897,631 A | * | 4/1999 | Yamamoto et al. ............. 707/1 |
| 6,243,713 B1 | * | 6/2001 | Nelson et al. ........... 707/104.1 |
| 6,374,258 B1 | * | 4/2002 | Fujita et al. ............. 707/104.1 |

* cited by examiner

*Primary Examiner*—Greta Robinson
(74) *Attorney, Agent, or Firm*—Fitzpatrick, Cella, Harper & Scinto

(57) ABSTRACT

In a system for recording scenario and material files into a storage unit and reproducing the material files based on the scenario file, an information processing method easily and surely prevents unnecessary material files from accumulating in the storage unit by, when a scenario file recorded in a hard disk is deleted, unnecessary material files in this hard disk are automatically deleted. Namely, in the hard disk, the scenario file to be deleted and a scenario file to remain are compared with each other, and material files that are used by the scenario file to be deleted and not used by the remaining scenario file are deleted.

22 Claims, 6 Drawing Sheets

INFORMATION PROCESSING METHOD, APPARATUS, AND SYSTEM FOR A MULTIMEDIA PRESENTATION SYSTEM WITH A FILE UPDATE PROCESS

BACKGROUND OF THE INVENTION

1. Field of the Invention

The present invention relates to an information processing apparatus and a file update method that updates files in storage means in which, e.g., material files and a scenario file that controls the material files have been stored; an information processing system and an information processing method that transfers, e.g., material files and a scenario file through a network, or the like, and then reproduces the files at a transfer destination; a presentation system and a presentation method that performs a presentation using, e.g., material files and a scenario file; and a storage medium that is used to realize each of the above-described methods.

2. Related Background Art

Recently, a multimedia presentation system that reproduces multimedia material files such as a still image, a motion image (or animation), a voice, a character, and the like, according to a sequence described in a scenario file that controls the multimedia material files in a time series, has received attention.

As shown in FIG. 7, the multimedia presentation system includes a PC (personal computer) 111, a multimedia server 113, which is connected to the PC 111 through a network 112, and a monitor 114 and speakers 115, which are connected to the multimedia server 113.

Next, a general use of this system will be explained.

Multimedia materials, such as an image, a voice, a character, and the like, to be used in a multimedia presentation are collected and filed by the PC 111. The filed multimedia materials, or material files, are edited by a dedicated authoring tool for the multimedia presentation system. More specifically, icons representing the voice, the still image, the motion image, and the character are dragged and dropped (i.e., in a drag-and-drop operation), and pasted according to a time base. Then a scenario file, which is written to describe a sequence for displaying the material files, is formed on the basis of information obtained from the pasting.

Afterwards, the formed scenario file and the material files, which together constitute a multimedia program, are transferred to the multimedia server 113 through the network 112. The transferred multimedia program is recorded into an HDD (hard disk) 120 of the server 113, and then reproduced in response to an instruction from a not-shown terminal to be provided to a viewer (or audience).

The above-described multimedia presentation system, which performs a presentation by using the multimedia materials, also performs a file update process according to a following procedure. FIG. 8 is a notional view showing a conventional file update process.

(1) The PC 111 transfers a new multimedia program, such as a program 131 shown in FIG. 8, to the HDD 120 of the multimedia server 113.

(2) If a directory named "PRESEN" of which, name is identical to that being transferred does not exist in the HDD 120 of the server 113 at the transfer destination, a directory named "PRESEN" is formed at the transfer destination.

(3) A scenario file named "a.SEN" and multimedia material files named "ab.jpg", "a.txt", and "a.snd", which are linked to and controlled or used by this scenario file, are recorded into the directory named "PRESEN" in the HDD 120 of the transfer destination. At this time, the contents of the HDD 120 of the multimedia server 113 are as shown in the program 131 of FIG. 8.

(4) Next, for example, it is assumed that an English version of a presentation scenario is necessary. In this case, a multimedia program 132 of FIG. 8 in which only a narration of the previously transferred multimedia program 131 of FIG. 8 has been changed is additionally transferred to the HDD 120.

(5) Because the directory named "PRESEN" now exists at the transfer destination, it is unnecessary to form such a directory.

(6) Because a scenario file named "b.SEN" does not exist, a scenario file "b.SEN" is recorded in the directory named "PRESEN" of the HDD 120.

(7) Because the image material file "ab.jpg" already exists, this file is recorded only in a case where a time stamp of the file at the PC 111 side has been updated.

(8) Because a voice material file named "b.snd" and a character material file named "b.txt" have been Anglicized and do not exist in the HDD 120, these files are recorded into the HDD 120. Thus, the directory named "PRESEN" in the HDD 120 of the multimedia server 113 corresponding to a multimedia program 133, such as shown in FIG. 8, results.

(9) Next, it is assumed that the presentation in English becomes unnecessary, and the scenario file named "b.SEN" is deleted. However, because there is a possibility that the material files may be referred to or used by another scenario file, the material files are left as is. Thus, the directory named "PRESEN" in the HDD 120 of the multimedia server 113 corresponding to a multimedia program 134, as shown in FIG. 8, results. It can be understood that unnecessary files (i.e., "b.snd" and "b.txt") of which file names start with "b" remain in the directory "PRESEN".

In the above-described related background art, there are the following problems.

As explained in the above-described procedure (9), in a case in which plural scenario files exist in the the same directory, it is sometimes necessary to delete one of the scenario files. In the above case, for example, when the scenario file named "b.SEN" for the English version is unnecessary, if the material files used by this scenario file are all deleted, the material file named "ab.jpg", which is also used by the scenario file named "a.SEN" for the Japanese version, is deleted. Thus, a situation is caused in which the scenario file for the Japanese version does not operate properly.

In order to eliminate such an inconvenience, as shown in the multimedia program 134 of FIG. 8, it is possible to delete only the scenario file named "b.SEN" but not delete any material files. In this case, as described above, there is the problem that unnecessary material files are accumulated in the HDD 120 of the multimedia server 133, and a disk capacity is uselessly consumed.

Further, there has been proposed a method that uses a link count, such as used in a UNIX filing system. In this method, how many scenario files a material file is referred to or used by is maintained or held or stored, a countdown is performed every time a scenario file is deleted, and the material file itself is deleted when the count reaches "0". However, because it is impossible to maintain or hold such a value for a material file such as an ordinary image, a voice, or the like, this method is inapplicable.

In order to eliminate these problems conventionally, a directory of a hard disk is periodically deleted together with the scenario file and the material files.

SUMMARY OF THE INVENTION

An object of the present invention is to solve all or at least one of the above-described problems.

Another object of the present invention is to provide an information processing apparatus, an information processing system, a presentation system, a file update system, an information processing method, a presentation method, and a storage medium, which can easily and surely prevent unnecessary files from accumulating in storage means.

According to a preferred embodiment of the present invention, an information processing method, which transfers and records material files and scenario files that control the material files in storage means, and which reproduces data of the material files on the basis of a scenario file in the storage means, includes:

a first step of processing a predetermined scenario file in the storage means to be nonreadable; and a second step of processing unnecessary material files in the storage means such that these files can not be automatically read.

Still another object of the present invention is to delete unnecessary sub files (or material files) from sub files (or material files) related to a scenario file, wherein the unnecessary sub files are not related to another scenario file.

According to a preferred embodiment of the present invention, in the above-described information processing method the unnecessary material files are material files that remain after material files that are used by a remaining (readable) scenario file are excluded from the material files used by the scenario file that has been processed to be nonreadable.

Further, in the above-described information processing method, the scenario file describes a sequence for controlling each of the material files in a time series.

Further, in the above-described information processing method, a material file is composed of data that includes image data, voice data, or character data.

Still another object of the present invention is to delete sub files (or material files) not used by a main file, from material files stored in a storage medium.

According to a preferred embodiment of the present invention, an information processing method includes:

a deletion designation step of designating, in a storage medium in which is stored a main file executed by an application program and a sub file related to the main file and used by the main file when the main file is executed, a file to be deleted, so as to control various file operations; and a deletion step of deleting the file designated in the deletion designation step, wherein the deletion step includes a control step of performing, when the main file designated in the deletion designation step is deleted, controlling to delete the sub file used by the main file and not used by another main file remaining in the storage medium.

Further, in the above-described information processing method, the sub file does not include therein link information to other files, and the main file includes link information to the sub file used when the main file is executed.

Further, in the above-described information processing method, the deletion step includes a list formation step of forming a list concerning the sub file used by the main file designated to be deleted and not used by another main file remaining in the storage medium, in accordance with the deletion designation stored in the deletion designation step.

Still another object of the present invention is to prevent, when deleting a scenario file executed by a presentation program, material files for a scenario file other than the scenario file to be deleted from being deleted.

According to a preferred embodiment of the present invention, in the above-described information processing method, the application program is a presentation program, the main file is a scenario file to be executed by the presentation program, and the sub file is a material file used by the scenario file in a time series.

Other objects and features of the present invention will become apparent from the following detailed description and the attached drawings.

BRIEF DESCRIPTION OF THE DRAWINGS

FIG. 3 is a view showing an example of a scenario file;

DETAILED DESCRIPTION OF PREFERRED EMBODIMENTS

Figure 1:
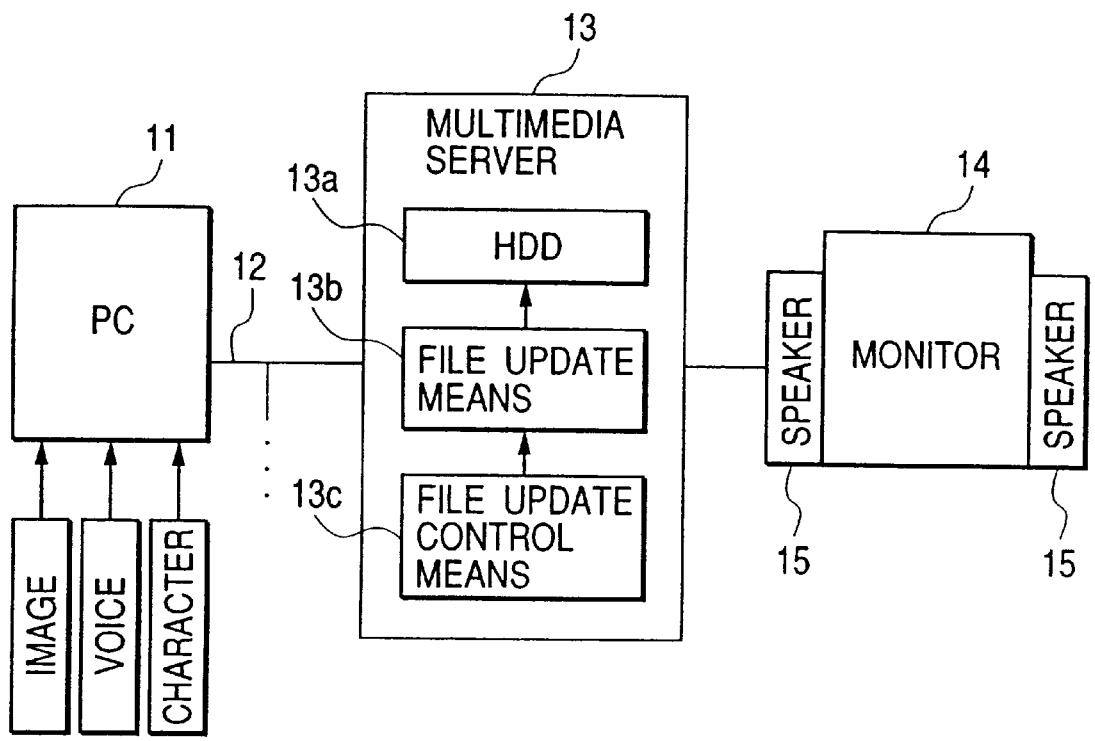
FIG. 1 schematically shows a structural view of a multimedia presentation system according to an embodiment of the present invention.

FIG. 1 is a block diagram showing a schematic structure of a multimedia presentation system according to an embodiment of the present invention.

In FIG. 1, numeral 11 denotes a PC (personal computer) used for multimedia program authoring. The PC 11 captures multimedia materials, such as an image, a voice, a character, and the like, which together constitute a multimedia program, and files them. Further, the PC 11 has a function to edit these filed materials, or material files, as a program by using, e.g., an authoring tool. By this editing function, a scenario file which relates to and describes a reproduction time for each of the image, voice, and character files is formed.

The PC 11 is connected to a multimedia server 13 through a network 12, such as an Ethernet, or the like. In this connection, the PC 11 has a function to transfer multimedia program data, which is composed of the above-described multimedia material files and the scenario file, to the side of the multimedia server 13.

Figure 5:
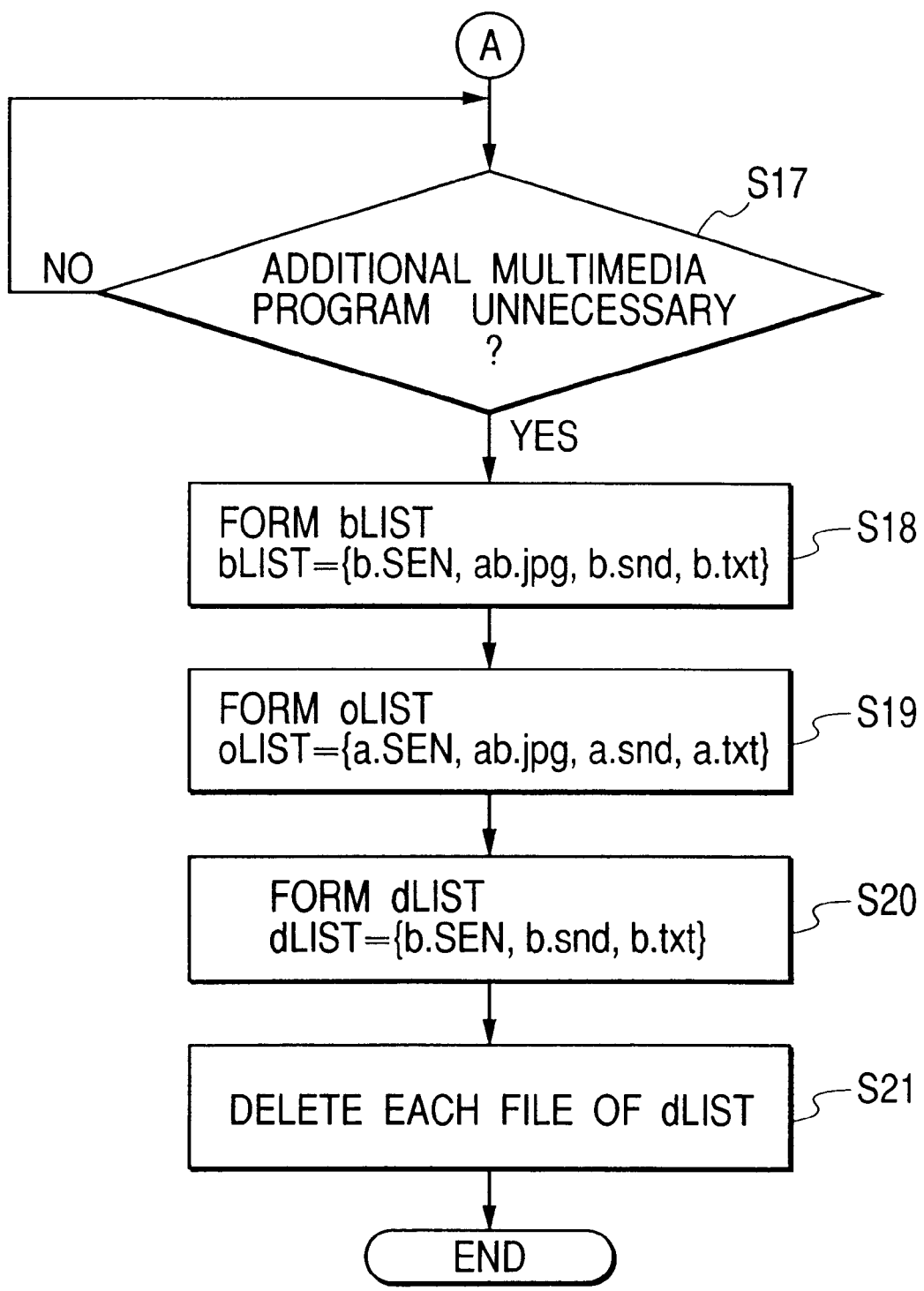
FIG. 5 is a flow chart showing a file update procedure according to an embodiment of the present invention.

The multimedia server 13 includes an HDD (hard disk) 13a, which accumulates or stores the program data transferred through the network 12. Also, the multimedia server 13 includes a file update means 13b and a file update control means 13c, which are features the present invention. The file update means 13b updates the contents of the files in the HDD 13a. When the file update means 13b deletes a predetermined scenario file in the HDD 13a, the file update control means 13c controls the file update means 13b to automatically delete unnecessary material files (which will be explained in detail below with reference to FIG. 5). It should be noted that the file update means 13b and the file update control means 13c can be structured not only as software but also as hardware. Also, the multimedia server 13 has a function to interpret the scenario file, and output image data and voice data to a monitor 14 and speakers 15, respectively.

Figure 2:
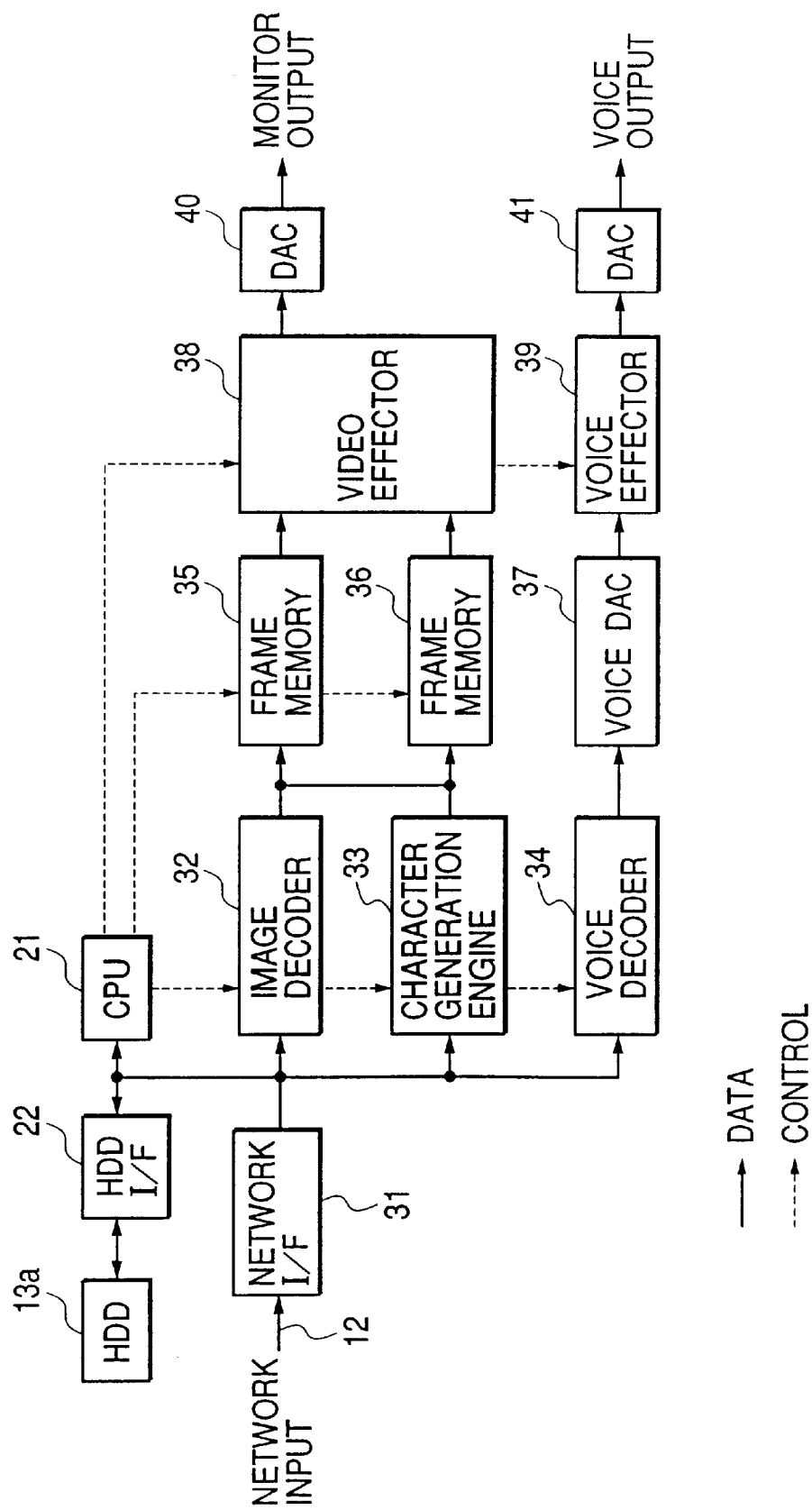
FIG. 2 is a block diagram showing a detailed structure of a multimedia server 13 shown in FIG. 1.

FIG. 2 is a block diagram showing a detailed structure of the multimedia server 13 shown in FIG. 1.

As shown in FIG. 2, the multimedia server 13 includes a CPU (central processing unit) 21, which controls an entire presentation operation. The CPU 21 is connected with the HDD 13a through an HDD I/F (hard disk interface) 22. The multimedia program data transferred through the network 12 is recorded or stored in the HDD 13a through a network I/F (interface) 31.

Afterwards, when the recorded data is reproduced, the CPU 21 interprets the scenario file read from the HDD 13a, and transfers the material files (i.e., image, character, and voice data files) stored in the HDD 13a to an image decoder 32, a character generation engine 33, and a voice decoder 34, respectively, on the basis of the interpreted result. Thereafter, an analog monitor output is outputted to the monitor 14 through frame memories 35 and 36, a video effector 38, and a DAC (digital-to-analog converter) 40, while an analog voice output is outputted to the speakers 15 through the voice decoder 34, a voice DAC 37, a voice effector 39, and a DAC 41.

Next, an operation procedure, from collection and editing of materials to reproduction of the collected and edited materials in the multimedia presentation system, will be explained.

(A) Collection and Editing of Material

The materials, i.e., an image, a voice, a character, and the like, to be subjected to or used in the multimedia presentation are collected or gathered by the PC 11. First, a still image is captured by a digital camera or a scanner, and edited by photo-retouching software (e.g., "PhotoImpact" manufactured by Ulead Systems, Inc., etc.). Then, the edited image data is subjected to JPEG (Joint Photographic Experts Group) compression, and filed.

A motion image is captured by a video capture board ("Power Capture PCI" manufactured by Canopus Corp., etc.), and edited and filed by motion image editing software ("Media Studio" manufactured by Ulead Systems, Inc., etc.). A voice is digitized by a sound board ("Soundblaster" manufactured by Creative Labs, Inc., etc.), and edited and filed by voice editing software ("CoolEdit 96" manufactured by Syntrillium Software Corp., etc.). a character is generated, edited, and filed by a general editor.

Thus, completed multimedia materials are edited by the authoring tool dedicated to the multimedia presentation system. More specifically, the voice, the still image, the motion image, and the character are dragged and dropped (i.e., in a drag-and-drop operation), and pasted according to a time base. Then a scenario file, which is written to include a sequence to reproduce the materials, is formed on the basis of information obtained by the pasting operation. An example of such the scenario file is shown in FIG. 3. Here, although a minimum-structure scenario is used for the explanation, an actual scenario file may include from tens of lines to hundreds of lines.

If the PC 11 can perform reproduction simulation, the PC 11 performs it. Then, if a desired multimedia program sequence is achieved, the scenario file and the material files are transferred to the multimedia server 13 through the network 12 (e.g., Ethernet). In order to prevent an unnecessary transfer, if a similar program already exists, a time stamp of each material file is measured, such that only an updated file is transferred.

(B) Reproduction by Multimedia Server

The transferred multimedia program (i.e., scenario file and material files) is recorded in the HDD 13a of the multimedia server 13, and then reproduced in response to an instruction from a not-shown terminal to be provided to a viewer.

Such a reproduction procedure will be explained below with reference to the scenario file shown in FIG. 3.

First, if the CPU 21 of the multimedia server 13 receives a reproduction instruction, the CPU 21 reads a scenario file named "a.sen" from the HDD 13a and interprets it.

Then, the CPU 21 interprets an initial line "play a.snd" of this scenario file, reads an "a.snd" file from the HDD 13a, and starts transferring the read file to the voice decoder 34. Further, the CPU 21 interprets a next line "load ab.jpg", transfers an "ab.jpg" file to the image decoder 32, and compresses/decompresses the file in the frame memory 35 to form an image. At this time, it is assumed that the output from the frame memory 36 is displayed as the monitor output.

Subsequently, the CPU 21 interprets a next line "loadtext a.txt", overwrites the characters on the still image formed in the frame memory 35. Finally, the CPU 21 interprets a next line "dis", and controls the video effector 38. Thus, as the CPU 21 uses a so-called "dissolve effect", it changes the image of the frame memory 36 currently displayed to the image of the frame memory 35 now formed.

Figure 4:
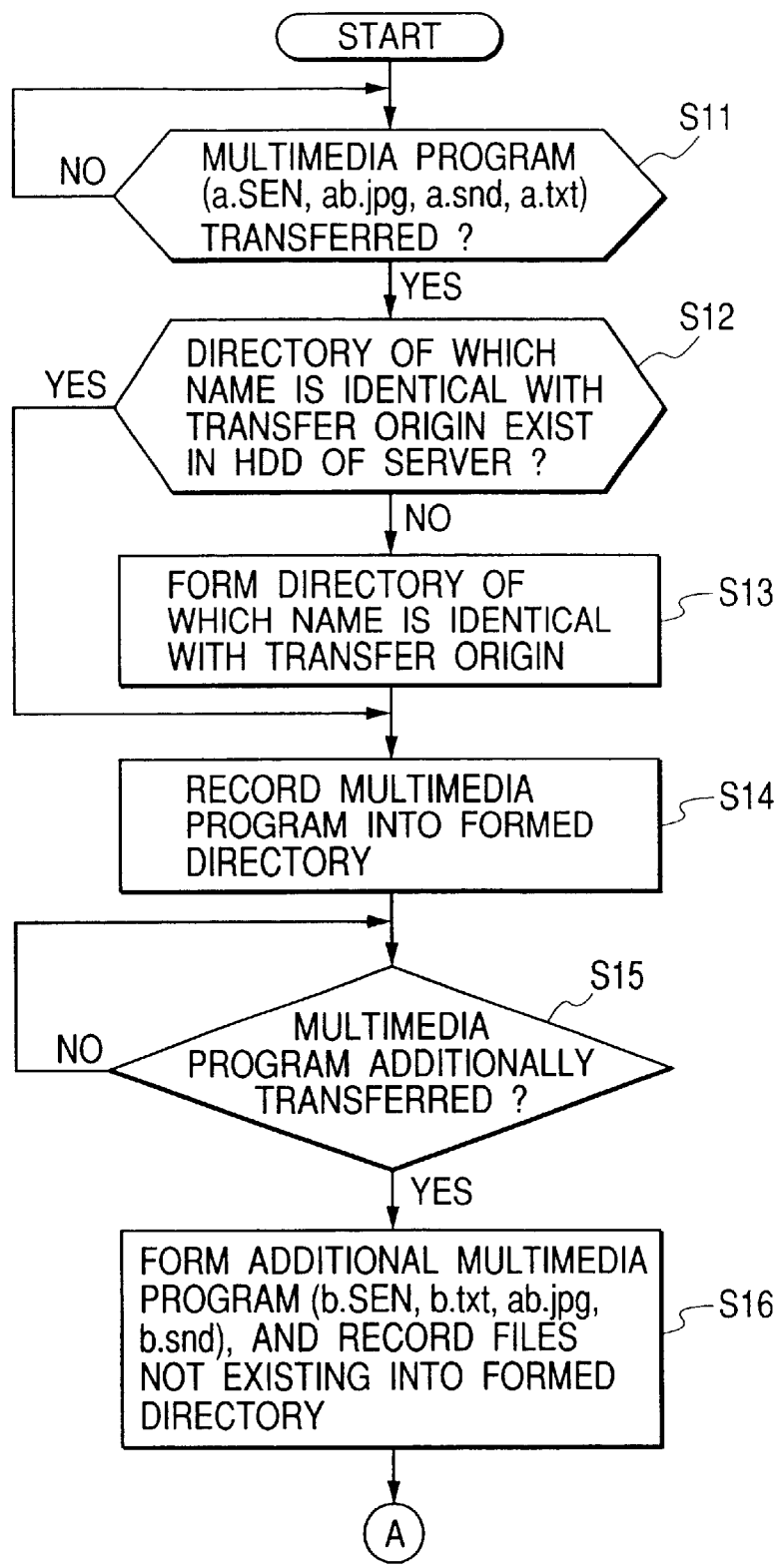
FIG. 4 is a flow chart showing a file update procedure according to an embodiment of the present invention.

In the multimedia presentation system according to the embodiment, the operation procedure from the collection and editing of the material files to the reproduction of those files is performed according to the scenario file. The file update feature of the present invention is performed according to the following procedure, as shown in the flow charts of FIGS. 4 and 5. It is assumed that a program to realize the procedures shown in these flow charts has been stored in, e.g., the HDD 13a of the multimedia server 13.

First, in step S11, it is judged whether or not the PC 11 is to transfer a new multimedia program. Namely, the PC 11 transfers, e.g., a new multimedia program 51, shown in FIG. 6, to the HDD 13a of the multimedia server 13, on the basis of a protocol ftp, or the like.

In a next step S12, it is judged whether or not a directory named "PRESEN", which name is identical with that of the directory to be transferred, exists in the HDD 13a of the multimedia server 13 at the transfer destination. If it is judged that a directory named "PRESEN" does not exist at the transfer destination, the flow advances to step S13 to form a directory named "PRESEN", which name is identical with the directory to be transferred.

In step S14, a scenario file named "a.SEN" and multimedia material files named "ab.jpg", "a.txt", and "a.snd", which are linked to and used by this scenario file, are recorded into the directory "PRESEN" m which exists in the HDD 13a. At this time, if a file of an identical name already exists in the HDD 13a, the PC 11 measures a time stamp thereof. Then, if the measured time stamp of the file is new, the PC 11 overwrites the contents to update this file. Conversely, if the measured time stamp is identical or old, the PC 11 does not do anything to the file. At this time, the contents of the HDD 13*a* are as shown in the program 51 of FIG. 6.

In step S15, it is assumed that an English version of a presentation scenario is necessary. In this case, a multimedia program 52, shown in FIG. 6, in which only a narration of a previously transferred multimedia program 51 has been changed to an English narration, is additionally transferred from the PC 11 to the HDD 13*a* of the multimedia server 13. At this time, because the directory named "PRESEN" now exists in the HDD 13*a*, it is unnecessary to form such a directory.

Figure 6:
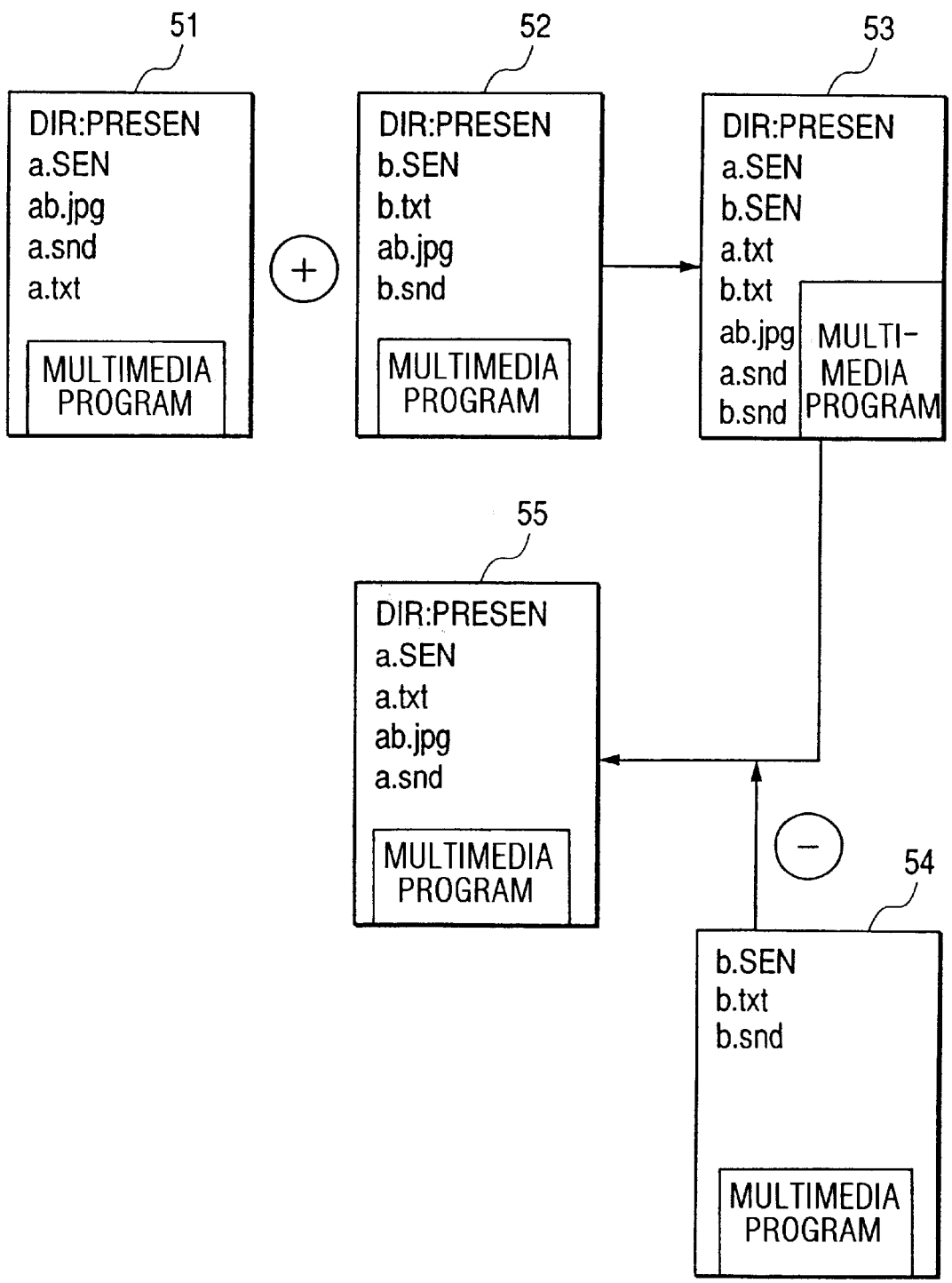
FIG. 6 conceptually shows a file update processing procedure according to an embodiment of the present invention.
Figure 7:
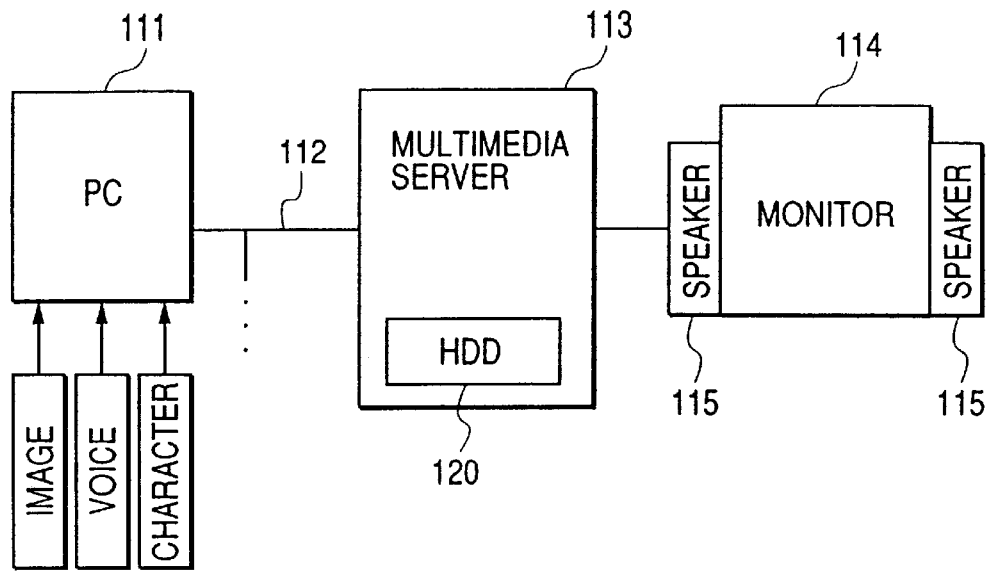
FIG. 7 is a block diagram showing a schematic structure of a conventional multimedia presentation system.
Figure 8:
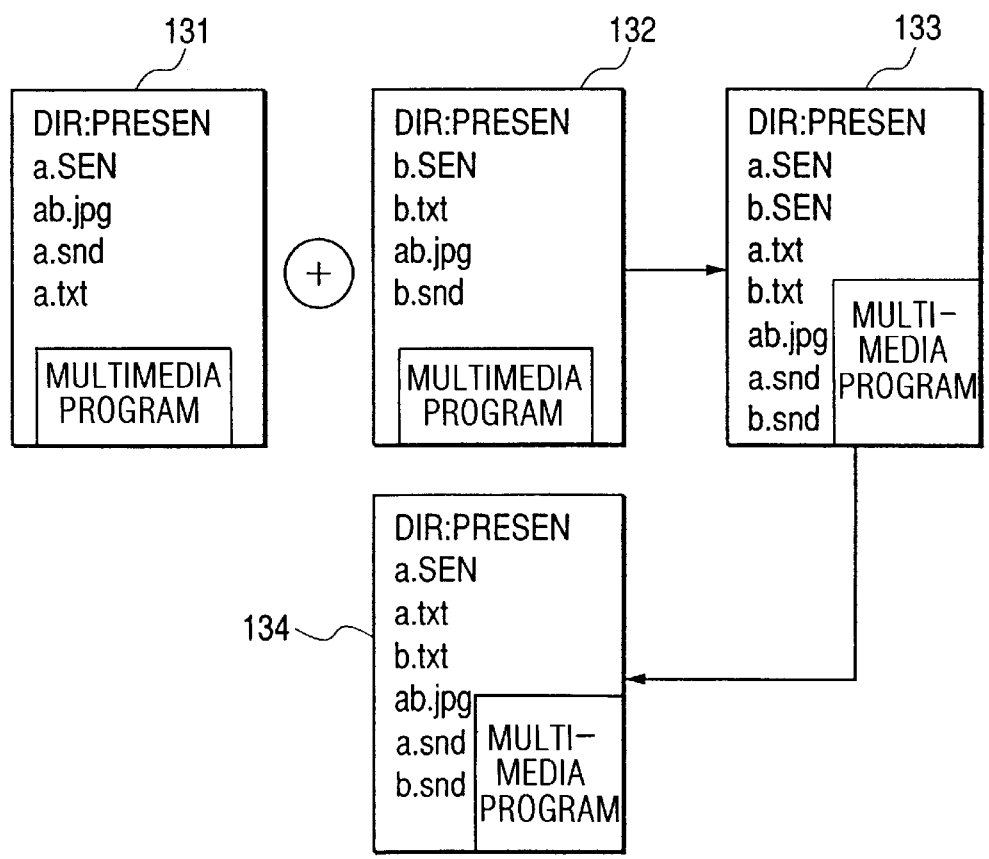
FIG. 8 conceptually shows a conventional file update processing procedure.

In step S16, of the material files that together constitute the additional multimedia program, only a file that does not already exist in the directory named "PRESEN" and an updated file are recorded into the HDD 13*a*. More specifically, because a scenario file named "b.SEN" does not exist in the directory named "PRESEN", this file "b.SEN" is recorded in the directory named "PRESEN". Conversely, because an image material file "ab.jpg" already exists in the directory named "PRESEN", this file "ab.jpg" is recorded only in a case where a time stamp of this file at the PC 11 side has been updated. Further, because a voice material file "b.snd" and a character material file "b.txt" have been Anglicized and do not exist in the directory named "PRESEN", these files are recorded HDD 13*a*. Thus, the directory named "PRESEN" in the HDD 13*a* of the multimedia server 13 is associated with a multimedia program 53, as shown in FIG. 6.

Steps S17 to S21 represent a processing procedure of the embodiment.

If the English presentation becomes unnecessary (step S17 of FIG. 5), in step S18 a list bLIST of material files (including "b.SEN") used by the scenario file named "b.SEN" is formed before the scenario file "b.SEN" is deleted. It is represented by bLIST={b.SEN, ab.jpg, b.snd, b.txt}.

In the next step S19, a list oLIST is formed of material files used in all other files (only "a.SEN" in the embodiment) in the same directory as that for the file named "b.SEN". It is represented by oLIST={a.SEN, ab.jpg, a.snd, a.txt}.

In step S20, a list dLIST is formed of material files that exist in the list bLIST but do not exist in the list oLIST (program 54 of FIG. 6). It is represented by dLIST={b.snd, b.txt}.

In the final step S21, the material files of the list dLIST are deleted from the directory named "PRESEN" of the HDD 13*a*. Thus, as shown in a program 55 of FIG. 6, unnecessary files each having a file name beginning with "b" all are deleted from the directory named "PRESEN", these files do not remain in the program 55.

As described above, according to the embodiment, if it is intended to delete the predetermined scenario file ("b.SEN" in the embodiment) recorded in the directory named "PRE-SEN" stored in the HDD 13*a* of the multimedia server 13, the unnecessary material files ("b.snd" and "b.txt" in the embodiment) stored in the directory named "PRESEN" are automatically deleted. Namely, a scenario file to be deleted and a scenario file to remain are compared with each other, material files used in the scenario file to remain are excluded from material files used by the scenario file to be deleted, and then the scenario file to be deleted is actually deleted. Thus, it is possible to easily and surely prevent unnecessary material files from accumulating in the HDD 13*a*.

In order to delete the unnecessary material files, the list of the material files used by the scenario file to be deleted and the list of the material files used by the scenario file to remain stored in the storage means are compared with each other to detect the unnecessary material files. Therefore, even if a material file itself does not include information representing a relation between this material file and a scenario file, it is possible to delete the unnecessary material files.

In the embodiment, the scenario file executed by a presentation program and the file update procedure for updating a material file used by this scenario file have been explained. Of course, the present invention is not limited to this. For example, it is apparent that the present invention is applicable to a case in which a certain main file executed by a certain application program and a sub file related to this main file are deleted. Namely, the present invention can be used in a case in which the sub file, such as a mere voice file, a mere JPEG file, or the like, related to the main file does not include any link information.

It has been explained that the computer program for realizing the procedure of the file update method of the present invention has been stored in the HDD 13*a* of the multimedia server 13. However, it is possible to store such a computer program into a storage device of the PC 11, such that the PC 11 executes an operation such as forming each list.

Further, in the above-described explanation of the embodiment, processing in an identical directory has been assumed. However, such an explanation is also applicable to a case in which the processing spreads over a directory hierarchy. For example, it is assumed that the scenario file has a specific scenario file is to be deleted, in step S19, all the scenario files existing in its own upper directories are searched for up to the root directory, and material files used in these scenario files are all registered in the list oLIST together with a directory path list of full paths.

Further, although the Ethernet is used as the network in the embodiment, a WAN (wide area network), such as an ISDN (integrated services digital network), or the like, a cable modem, a satellite line, or the like, may be similarly used as the network. Further, although the hard disk is used as recording means, an MO (magnetooptical disk), a CD-RW (compact disk rewritable), a DVD-RAM (digital versatile disk random access memory), an FDD (floppy disk drive), or the like, can be similarly used as the recording means.

It is needless to say that the present invention is not limited to the apparatus in the above-described embodiment, but may be applied to a system composed of plural equipments or an apparatus composed of one equipment. It is also needless to say that the object of the present invention can be achieved even in a case where a storage medium storing program codes of a software program for realizing the functions of the above-described embodiment is supplied to a system or an apparatus, and then a computer (or CPU or MPU) in the system or the apparatus reads and executes the program codes stored in the storage medium.

In this case, the program codes themselves read from the storage medium realize the functions of the embodiment, and the storage medium storing such program codes constitute the present invention. The storage medium storing the program codes can be, e.g., a floppy disk, a hard disk, an optical disk, a magnetooptical disk, a CD-ROM, a CD-R, a magnetic tape, a non-volatile memory card, a ROM, or the like. Further, it is needless to say that the present invention also includes not only the case in which the functions of the embodiment are realized by execution of the program codes read by the computer, but also a case in which an OS, or the like, running on the computer executes all the processing or a part thereof according to the instructions of the program codes, thereby realizing the functions of the embodiment.

Further, it is needless to say that the present invention further includes a case in which the program codes read from the storage medium are stored in a memory provided in a function expansion board inserted in the computer or a function expansion unit connected to the computer, and a CPU, or the like, provided in the function expansion board or the function expansion unit executes all the processing or a part thereof according to the instructions of such program codes, thereby realizing the functions of the embodiments.

According to the above-described embodiment, it is possible to easily prevent unnecessary files from accumulating, and to delete a sub file that is not related to any main file. Therefore, it is possible to prevent redundant data from accumulating in a storage medium and a necessary sub file from being erroneously deleted.

Further, even if an image file or a voice file used as a sub file itself is not recorded with the information representing its relation to a main file, it is possible to delete the sub file if it is unnecessary.

Further, if the present invention is applied to a presentation program or system that frequently uses a file of a JPEG image or voice, which itself does not include any information representing its relation to other files, a derived effect is large.

Although the present invention has been explained with preferred embodiments, the present invention is not limited to the structure of such embodiments. That is, various modifications and changes to those embodiments are possible without departing from the spirit and scope of the attached claims.

What is claimed is:

1. An information processing method in which material files and scenario files that control the material files are recorded in storage means and in which data of a set of material files is reproduced based on a corresponding scenario file recorded in the storage means, said method comprising:

a first processing step of processing a predetermined scenario file recorded in the storage means so as to make the predetermined scenario file nonreadable;

a determination step of determining unnecessary material files from the material files recorded in the storage means, wherein the unnecessary material files are material files that are not controlled by any scenario file other than the predetermined scenario file that has been processed to be unreadable; and a second processing step of processing the unnecessary material files controlled by the predetermined scenario file to make the unnecessary material files nonreadable.

2. A method according to claim 1, wherein a scenario file describes a sequence for controlling each material file of a set of material files in a time series.

3. A method according to claim 1, wherein a material file is comprised of image data, voice data, or character data.

4. An information processing apparatus comprising:

storage means for recording material files and scenario files that control the material files;

file update means for updating a file recorded in said storage means, for processing a predetermined scenario file recorded in said storage means to be unreadable, and for determining unnecessary material files from the material files recorded in said storage means, wherein the unnecessary material files are material files that are not controlled by any scenario file other than the predetermined scenario file that has been processed to be nonreadable; and control means for, when a predetermined scenario file recorded in said storage means is processed to make the predetermined scenario file nonreadable by said file update means, controlling said file update means to process unnecessary material files recorded in said storage means to make the unnecessary files nonreadable.

5. An apparatus according to claim 4, wherein a scenario file describes a sequence for controlling each material file of a set of material files in a time series.

6. An apparatus according to claim 4, wherein a material file is comprised of image data, voice data, or character data.

7. An information processing system that includes a data transfer apparatus for transferring material files and scenario files that control the material files, storage means for recording the material files and scenario files transferred by the data transfer apparatus, and a reproduction apparatus for reproducing data of a set of material files based on a corresponding scenario file recorded in the storage means, said system comprising:

first processing means for processing a predetermined scenario file recorded in the storage means to make the predetermined scenario file nonreadable;

determination means for determining unnecessary material files from the material files recorded in the storage means, wherein the unnecessary material files are material files that are not controlled by any scenario file other than the predetermined scenario file that has been processed to be nonreadable; and second processing means for processing the unnecessary material files controlled by the predetermined scenario file to make the unnecessary material files nonreadable.

8. A system according to claim 7, wherein a scenario file describes a sequence for controlling each material file of a set of material files in a time series.

9. A system according to claim 7, wherein a material file is comprised of image data, voice data, or character data.

10. A presentation system comprising:

means for editing material files;

means for forming a scenario file to control the material files;

storage means for recording the material files and the scenario file;

reproduction means for reproducing data of the material files based on the scenario file recorded in said storage means;

determination means for determining unnecessary material files from the material files recorded in said storage means, wherein the unnecessary material files are controlled by a predetermined scenario file recorded in said storage means that has been processed to be nonreadable, and wherein the unnecessary material files are not controlled by any scenario file other than a predetermined scenario file that has been processed to be nonreadable; and control means for processing the unnecessary material files recorded in said storage means to make the unnecessary material files nonreadable.

11. A system according to claim 10, wherein the scenario file describes a sequence for controlling each of the material files in a time series.

12. A method for updating recording states of material files and scenario files recorded in a storage medium, wherein the scenario files control the material files, said method comprising:

a first processing step of processing a predetermined scenario file recorded in the storage medium to make the predetermined scenario file nonreadable;

a determination step of determining unnecessary material files from the material files recorded in the storage medium, wherein the unnecessary material files are material files that are not controlled by any scenario file other than the predetermined scenario file that has been processed to be nonreadable; and a second processing step of processing the unnecessary material files controlled by the predetermined scenario file to make the unnecessary material files nonreadable.

13. A method according to claim 12, wherein a scenario file describes a sequence for controlling each material file of a set of material files in a time series.

14. A method according to claim 12, wherein a material file is comprised of image data, voice data, or character data.

15. A multimedia presentation method comprising:

an editing step of editing a multimedia material file that includes image data, voice data, or character data, and a scenario file for controlling the multimedia material file;

a storage step of recording the multimedia material file and the scenario file in storage means;

a reproduction step of reproducing data of the multimedia material file based on the scenario file recorded in the storage means;

a determination step of determining unnecessary material files from the material files recorded in the storage means, wherein the unnecessary material files are controlled by a predetermined scenario file recorded in the storage means that has been processed to be nonreadable, and wherein the unnecessary material files are not controlled by any scenario file other than a predetermined scenario file that has been processed to be nonreadable; and a processing step of when the predetermined scenario file recorded in the storage means is processed to be nonreadable, processing the unnecessary material files stored in the storage means and controlled by the predetermined scenario file to be nonreadable.

16. A method according to claim 15, wherein a scenario file describes a sequence for controlling each material file of a set of material files in a time series.

17. A storage medium storing a computer-readable program for implementing a file update method of updating files recorded in storage means, the storage means storing material files and scenario files that control the material files, the method comprising:

a first processing step of processing a predetermined scenario file recorded in the storage medium to make the predetermined scenario file nonreadable;

a determination step of determining unnecessary material files from the material files recorded in the storage means, wherein the unnecessary material files are material files that are not controlled by any scenario file other than the predetermined scenario file that has been processed to be nonreadable; and a second processing step of processing unnecessary material files controlled by the predetermined scenario file to make the unnecessary material files nonreadable.

18. A medium according to claim 17, wherein a scenario file describes a sequence for controlling each material file of a set of material files in a time series.

19. A medium according to claim 17, wherein a material file is comprised of image data, voice data, or character data.

20. An information processing method, comprising:

a deletion designation step of designating, in a storage medium that stores main files executed by an application program and sub files related to the main files and used when the main files are executed, a main file to be deleted, so as to control various file operations; and a deletion step of deleting the main file designated in said deletion designation step, wherein said deletion step includes:

(i) a determination step of determining a sub file to be deleted, wherein the sub file to be deleted is a material file that remains after sub files used by remaining main files are excluded from a set of sub files used by the main file to be deleted, and (ii) a control step of, when the main file designated in said deletion designation step is deleted, controlling to delete the sub file determined in the determination step, which is used by the main file and not used by another main file remaining in the storage medium, wherein the application program is a presentation program, a main file is a scenario file to be executed by the presentation program, and a sub file is a material file used by a scenario file in a time series, and wherein the sub file to be deleted is a material file that remains after sub files used by the remaining main files are excluded from all sub files used by the main file to be deleted.

21. A method according to claim 20, wherein a sub file does not include therein link information to other files, and a main file includes link information to a sub file used when that main file is executed.

22. A method according to claim 20, wherein said deletion step includes a list formation step of forming a list of sub files used by the main file designated to be deleted and not used by another main file remaining in the storage medium, in accordance with a deletion designation stored in said deletion designation step.

* * * * *